United States Patent
Mizutani et al.

(10) Patent No.: US 9,624,563 B2
(45) Date of Patent: Apr. 18, 2017

(54) STAINLESS STEEL FOIL AND CATALYST CARRIER FOR EXHAUST GAS PURIFYING DEVICE USING THE FOIL

(75) Inventors: Akito Mizutani, Chiba (JP); Mitsuyuki Fujisawa, Chiba (JP); Hiroki Ota, Chiba (JP); Yasushi Kato, Chiba (JP)

(73) Assignee: JFE Steel Corporation, Tokyo (JP)

(*) Notice: Subject to any disclaimer, the term of this patent is extended or adjusted under 35 U.S.C. 154(b) by 113 days.

(21) Appl. No.: 14/008,335

(22) PCT Filed: Mar. 28, 2012

(86) PCT No.: PCT/JP2012/059122
§ 371 (c)(1),
(2), (4) Date: Jun. 12, 2014

(87) PCT Pub. No.: WO2012/137792
PCT Pub. Date: Oct. 11, 2012

(65) Prior Publication Data
US 2014/0287914 A1 Sep. 25, 2014

(30) Foreign Application Priority Data

Apr. 1, 2011 (JP) ................. 2011-081600
Jan. 6, 2012 (JP) ................. 2012-000914
Mar. 22, 2012 (JP) ................. 2012-064829

(51) Int. Cl.
*C22C 38/06* (2006.01)
*C22C 38/20* (2006.01)
(Continued)

(52) U.S. Cl.
CPC ............ *C22C 38/54* (2013.01); *B01J 35/04* (2013.01); *B01J 37/0225* (2013.01);
(Continued)

(58) Field of Classification Search
None
See application file for complete search history.

(56) References Cited

U.S. PATENT DOCUMENTS 4,331,631 A    5/1982   Chapman et al.
8,580,190 B2  11/2013   Hattendorf
(Continued)

FOREIGN PATENT DOCUMENTS

DE    10310865    5/2004
EP     0516267   12/1992
(Continued)

OTHER PUBLICATIONS

Introduction to Steels and Cast Irons, Table 1.1 "Essential and incidental elements in steel and cast iron," ASM, 1992.*
(Continued)

*Primary Examiner* — Deborah Yee
(74) *Attorney, Agent, or Firm* — RatnerPrestia (57) ABSTRACT

Provided are a stainless steel foil and a catalyst carrier for an exhaust gas purifying device which uses the foil. Specifically, a stainless steel foil contains, in percent by mass, 0.05% or less of C, 2.0% or less of Si, 1.0% or less of Mn, 0.003% or less of S, 0.05% or less of P, more than 15.0% and less than 25.0% of Cr, 0.30% or less of Ni, 3.0% to 10.0% of Al, 0.03% to 1.0% of Cu, 0.10% or less of N, 0.02% or less of Ti, 0.02% or less of Nb, 0.02% or less of Ta, 0.005% to 0.20% of Zr, 0.03% to 0.20% of REM excluding Ce, 0.02% or less of Ce, 2.0% to 6.0% in total of at least one of Mo and W, and the balance being Fe and incidental impurities.

17 Claims, 2 Drawing Sheets

(51) Int. Cl.

| | | |
|---|---|---|
| *C22C 38/50* | (2006.01) | |
| *C22C 38/22* | (2006.01) | |
| *C22C 38/28* | (2006.01) | |
| *C22C 38/54* | (2006.01) | |
| *B01J 35/04* | (2006.01) | |
| *B01J 37/02* | (2006.01) | |
| *C22C 38/00* | (2006.01) | |
| *C22C 38/02* | (2006.01) | |
| *C22C 38/04* | (2006.01) | |
| *C22C 38/42* | (2006.01) | |
| *C22C 38/44* | (2006.01) | |
| *C22C 38/48* | (2006.01) | |
| *C21D 6/00* | (2006.01) | |
| *C22C 38/18* | (2006.01) | |
| *C22C 38/32* | (2006.01) | |
| *B01D 53/94* | (2006.01) | |
| *F01N 3/28* | (2006.01) | |

(52) U.S. Cl.
CPC ............ *C21D 6/004* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/18* (2013.01); *C22C 38/22* (2013.01); *C22C 38/32* (2013.01); *C22C 38/42* (2013.01); *C22C 38/44* (2013.01); *C22C 38/48* (2013.01); *C22C 38/50* (2013.01); *B01D 53/94* (2013.01); *B01D 2255/2073* (2013.01); *B01D 2255/2092* (2013.01); *B01D 2255/20707* (2013.01); *B01D 2255/20715* (2013.01); *B01D 2255/20738* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *F01N 3/281* (2013.01)

(56) References Cited

U.S. PATENT DOCUMENTS

2007/0110609 A1   5/2007   Hattendorf
2008/0210348 A1*  9/2008   Goransson .............. C22C 38/02
                                                              148/537

FOREIGN PATENT DOCUMENTS

| JP | 56-96726 | 8/1981 | |
|---|---|---|---|
| JP | H04-116140 A | 4/1992 | |
| JP | 4-350148 A | 12/1992 | |
| JP | 05-277380 | 10/1993 | |
| JP | 6-116686 A | 4/1994 | |
| JP | 6-212363 A | 8/1994 | |
| JP | 2001164341 | 6/2001 | |
| JP | 3210535 | 7/2001 | |
| JP | 2004-169110 A | 6/2004 | |
| JP | 2005-504176 A | 2/2005 | |
| JP | 2009-46718 A | 3/2009 | |
| JP | WO 2010/147092 A1 * | 12/2010 | ............ C22C 38/22 |
| WO | 2005100628 | 10/2005 | |
| WO | 2009124530 | 10/2009 | |

OTHER PUBLICATIONS

Machine-English translation of WO 2010/147092-A1, Oku et al., Dec. 2010.*
International Search Report dated Jun. 19, 2012, application No. PCT/JP2012/059122.
Extended European Search Report for European Patent Application No. 12768301.9-1353 mailed Jan. 7, 2015.

* cited by examiner

UNITS OF MEASURE FOR DIMENSIONS: mm

STAINLESS STEEL FOIL AND CATALYST CARRIER FOR EXHAUST GAS PURIFYING DEVICE USING THE FOIL

CROSS REFERENCE TO RELATED APPLICATIONS

This application is the U.S. National Phase application of PCT/JP2012/059122, filed Mar. 28, 2012, and claims priority to Japanese Patent Application No. 2011-081600, filed Apr. 1, 2011, Japanese Patent Application No. 2012-000914, filed Jan. 6, 2012, and Japanese Patent Application No. 2012-064829, filed Mar. 22, 2012, the disclosures of each of which are incorporated herein by reference in their entireties for all purposes.

FIELD OF THE INVENTION

The present invention relates to a stainless steel foil which is used in catalyst carriers for exhaust gas purifying devices for automobiles, motorcycles, marine bikes, snowmobiles, and the like and which has high strength (in particular, in terms of rupture stress and distortion resistance) at high temperatures, excellent oxidation resistance at high temperatures, and excellent salt corrosion resistance, and also relates to a catalyst carrier for an exhaust gas purifying device using the foil.

BACKGROUND OF THE INVENTION

Figure 1:
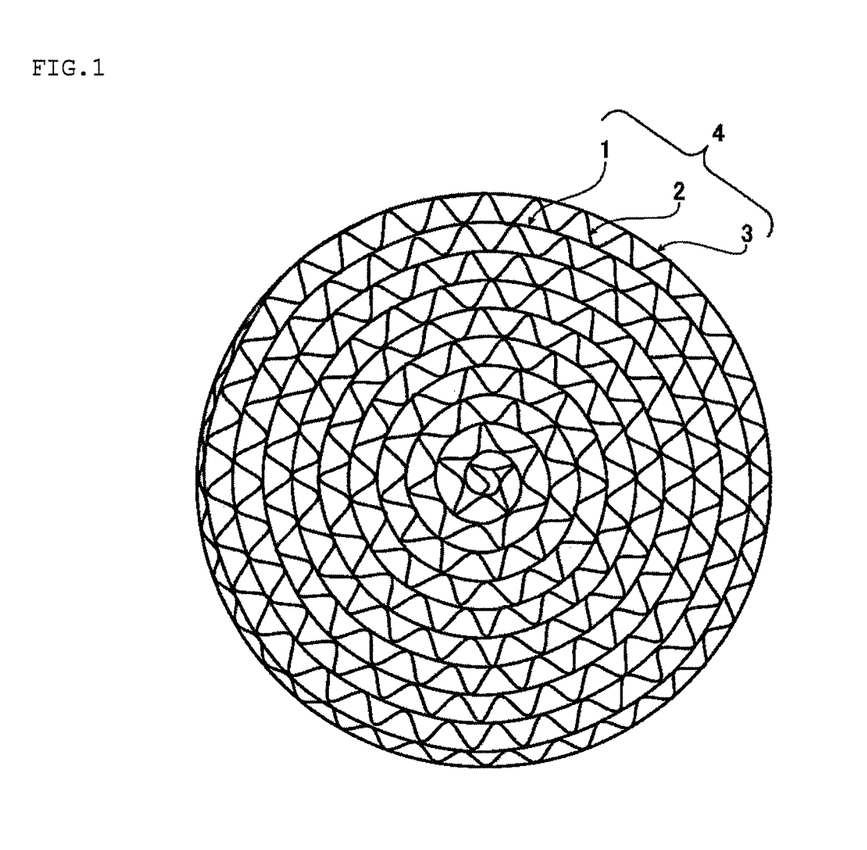
FIG. 1 is a view showing an example of a metal honeycomb.

Ferritic stainless steel composed of an Fe—Cr—Al-based alloy has excellent oxidation resistance at high temperatures, and therefore, is used in parts (e.g., catalyst carriers, a variety of sensors, and the like) for exhaust gas purifying devices for automobiles, motorcycles, marine bikes, motorboats, and the like. Furthermore, it is used in parts of frameworks for stoves, gas burners, and heating furnaces, and also is used in electric heating elements of heaters by taking advantage of its property of high electric resistivity. For example, Patent Literature 1 discloses a metal honeycomb using, instead of a conventional ceramic catalyst carrier, an Fe—Cr—Al-based stainless steel foil with a foil thickness of 20 to 100 μm having excellent oxidation resistance at high temperatures for the purpose of downsizing of catalyst carriers for exhaust gas purifying devices for automobiles and improvement in engine performance. Regarding this metal honeycomb, for example, flat stainless steel foils (flat foils) and corrugated stainless steel foils (corrugated foils) are alternately stacked to form a honeycomb structure, and a catalytic material is applied onto the surface of the stainless steel foils. The resulting metal honeycomb is used for an exhaust gas purifying device. FIG. 1 shows an example of a metal honeycomb. A metal honeycomb 4 is produced by winding a stacked structure including a flat foil 1 and a corrugated foil 2 into a roll shape, and fastening the outer periphery thereof with an external cylinder 3.

When the wall thickness of a catalyst carrier is reduced by using such a stainless steel foil, its thermal capacity is decreased. Consequently, the catalyst can be activated in a short period of time from engine starting, and exhaust back pressure can be decreased, thus being effective in downsizing of the catalyst carrier and improvement in engine performance.

On the other hand, automobile exhaust gas regulations are expected to be further tightened from the standpoint of environmental protection. In order to reduce nitroxides, carbon monoxide, and carbon hydrides emitted from gasoline vehicles and the like, techniques, such as one in which a catalyst carrier for an exhaust gas purifying device is placed at a position directly under the engine, close to the actual combustion environment, and a catalytic reaction is caused by high-temperature exhaust gas with the result that the amount of harmful substances in exhaust gas is reduced, have been developed. Furthermore, in order to improve fuel efficiency, engine combustion efficiency is enhanced, and the temperature of the exhaust gas itself is increased. Accordingly, catalyst carriers for automotive exhaust gas purifying devices are likely to be subjected to strong vibration in a harsher environment than before.

In order to cope with such a situation, stainless steel foils having various properties to catalyst carriers for automotive exhaust gas purifying devices have been proposed. For example, Patent Literature 2 discloses a heat-resistant stainless steel foil in which Mo and W are added into an Fe-20Cr-5Al alloy containing Zr, Hf, and a rare-earth element, and 1% to 15% of Ni is further added thereinto to precipitate NiAl, and thereby, proof stress (strength) at high temperatures is increased, resulting in improvement in durability. Furthermore, Patent Literature 3 discloses a stainless steel foil having excellent strength at high temperatures, which is a material for low thermal capacity and low exhaust gas pressure use, in which the foil thickness is less than 40 μm, and the Al content and the Cr content are changed in response to the foil thickness, and into which Nb, Mo, Ta, W, and the like are added. Patent Literature 4 discloses an alloy foil for a metal carrier in which proof stress at high temperatures and oxidation resistance are improved by adding Nb, Ta, Mo, and W into an Fe-20Cr-5Al alloy containing Y Mischmetal or mixed metals. Furthermore, Patent Literature 5 discloses a heat-resistant stainless steel foil in which proof stress at high temperatures are enhanced and durability is improved by adding a specific amount of Ta relative to C+N, Mo, W, and Nb into an Fe-20Cr-5Al alloy containing La, Ce, Pr, and Nd.

PATENT LITERATURE

PTL 1: Japanese Unexamined Patent Application Publication No. 56-96726
PTL 2: Japanese Unexamined Patent Application Publication (Translation of PCT Application) No. 2005-504176
PTL 3: Japanese Patent No. 3210535
PTL 4: Japanese Unexamined Patent Application Publication No. 5-277380
PTL 5: Japanese Examined Patent Application Publication No. 6-104879

SUMMARY OF THE INVENTION

Since a large amount of Ni, which is an austenite-stabilizing element, is contained in the stainless steel foil described in Patent Literature 2, the amount of solid solution Al, which is a ferrite-stabilizing element in steel, is decreased in the foil oxidation process, and part of the ferrite becomes austenitized. Therefore, the thermal expansion coefficient is largely changed, and strength at high temperatures, in particular, distortion resistance, of the catalyst carrier is deteriorated, which is a problem. As a result, in some cases, failures may occur, such as falling off of the catalyst carried and collapse of the corrugated foil.

Furthermore, in the stainless steel foils described in Patent Literatures 3 to 5, incorporation of Nb and Ta improves strength at high temperatures, but markedly deteriorates oxidation resistance at high temperatures, which is a problem. Moreover, Nb and Ta are likely to form oxides with Fe and Al, and such oxides cause distortion of the foil geometry (a decrease in strength at high temperatures) during the heating process and the cooling process.

Furthermore, when the stainless steel foils described in Patent Literatures 2 to 5 are applied to catalyst carriers for exhaust gas purifying devices for marine bikes and motorboats, salt corrosion is likely to be caused by contact with seawater or the like, which is also a problem.

The present invention aims to provide a stainless steel foil having high strength at high temperatures, excellent oxidation resistance at high temperatures, and excellent salt corrosion resistance, and a catalyst carrier for an exhaust gas purifying device using the foil.

The present inventors have performed thorough studies in order to achieve the object described above and have found that, in an Fe—Cr—Al-based stainless steel foil, it is effective to decrease the contents of Ni, Nb, and Ta and to add more than 15% by mass of Cr, 0.03% by mass or more of Cu, and 2.0% to 6.0% by mass of at least one of Mo and W.

The present invention has been achieved on the basis of such a finding. The present invention provides a stainless steel foil characterized by containing, in percent by mass, 0.05% or less of C, 2.0% or less of Si, 1.0% or less of Mn, 0.003% or less of S, 0.05% or less of P, more than 15.0% and less than 25.0% of Cr, 0.30% or less of Ni, 3.0% to 10.0% of Al, 0.03% to 1.0% of Cu, 0.10% or less of N, 0.02% or less of Ti, 0.02% or less of Nb, 0.02% or less of Ta, 0.005% to 0.20% of Zr, 0.03% to 0.20% of REM excluding Ce, 0.02% or less of Ce, 2.0% to 6.0% in total of at least one of Mo and W, and the balance being Fe and incidental impurities.

In the stainless steel foil of the present invention, the REM excluding Ce is preferably La. Furthermore, preferably, the total, in percent by mass, of at least one of Mo and W is 3.0% to 5.5%. Furthermore, preferably, the stainless steel foil contains separately or together at least one of 0.01% to 0.20% of Hf (in percent by mass), 10 to 300 ppm of Ca, 15 to 300 ppm of Mg, and 3 to 100 ppm of B (in ppm by mass).

In the stainless steel foil of the present invention, preferably, the foil thickness is 20 to 100 μm.

The present invention also provides a catalyst carrier for an exhaust gas purifying device characterized by using any of the stainless steel foils having the composition or foil thickness described above.

According to the present invention, it is possible to obtain a stainless steel foil having high strength at high temperatures, excellent oxidation resistance at high temperatures, and excellent salt corrosion resistance. The stainless steel foil is suitable for use not only in catalyst carriers for exhaust gas purifying devices for automobiles, motorcycles, marine bikes, snowmobiles, and the like, but also in members for other combustion gas exhaust system devices.

DETAILED DESCRIPTION OF EMBODIMENTS OF THE INVENTION

First, reasons for limiting the composition of a stainless steel foil according to embodiments of the present invention will be described in detail.

The units of measure "%" and "ppm" for the content of the compositional elements shown below mean "percent by mass" and "ppm by mass", respectively.

C: 0.05% or Less

When the C content exceeds 0.05%, strength at high temperatures is decreased and oxidation resistance at high temperatures is deteriorated. Furthermore, toughness is deteriorated. Therefore, the C content is set at 0.05% or less, and preferably 0.02% or less. More preferably, the C content is decreased as much as possible. However, in order to further increase the strength of steel, the C content is preferably set at 0.001% or more, and more preferably 0.003% or more.

Si: 2.0% or Less

When the Si content exceeds 2.0%, toughness is deteriorated, and workability is degraded, resulting in difficulty in production of a foil. Therefore, the Si content is set at 2.0% or less, and preferably 1.0% or less. However, in order to further improve oxidation resistance, the Si content is preferably set at 0.05% or more, and more preferably 0.1% or more.

Mn: 1.0% or Less

When the Mn content exceeds 1.0%, oxidation resistance at high temperatures is deteriorated, and salt corrosion resistance is also deteriorated. Therefore, the Mn content is set at 1.0% or less, and preferably 0.5% or less. However, in order to stabilize S in steel, the Mn content is preferably set at 0.05% or more, and more preferably 0.1% or more.

S: 0.003% or Less

When the S content exceeds 0.003%, adhesion of an $Al_2O_3$ layer in a catalyst carrier and oxidation resistance at high temperatures are deteriorated. Therefore, the S content is set at 0.003% or less, and preferably 0.001% or less. More preferably, the S content is reduced as much as possible.

P: 0.05% or Less

When the P content exceeds 0.05%, not only workability is degraded, resulting in difficulty in production of a foil, but also adhesion of an $Al_2O_3$ layer in a catalyst carrier and oxidation resistance at high temperatures are deteriorated. Therefore, the P content is set at 0.05% or less, and preferably 0.03% or less. More preferably, the P content is reduced as much as possible.

Cr: More than 15.0% and Less than 25.0%

Cr is one of the most important elements in the present invention and is an essential element in securing strength at high temperatures and salt corrosion resistance. However, when the Cr content is 15.0% or less, the amount of Al, which is a ferrite-stabilizing element, and the like is decreased during the oxidation process at high temperatures, resulting in formation of austenite. Consequently, the thermal expansion coefficient is largely changed, and strength at high temperatures, in particular, distortion resistance is deteriorated. Furthermore, Salt corrosion resistance is also deteriorated. On the other hand, when the Cr content is 25.0% or more, toughness of the slab or hot-rolled sheet is degraded. As a result, hot brittleness easily occurs, and the production cost increases, which spoils economic efficiency. Therefore, the Cr content is set at more than 15.0% and less than 25.0%, and preferably 18.0% to 23.0%.

Ni: 0.30% or Less

Ni is an austenite-stabilizing element. When the Ni content exceeds 0.30% and when, during the oxidation process at high temperatures, Al is depleted and Cr begins being oxidized, austenite is formed, which changes the thermal expansion coefficient of the foil, resulting in failures, such as constriction and fracture of the foil. Therefore, the Ni content is set at 0.30% or less, and preferably 0.20% or less. Ni has an effect of improving brazability in the process of producing a catalyst carrier, and thus, the content thereof is preferably set at 0.05% or more, and more preferably 0.10% or more.

Al: 3.0% to 10.0%

Al is an element that forms a highly protective $Al_2O_3$ layer on the surface of a foil to improve oxidation resistance at high temperatures. Al also has an effect of improving strength at high temperatures. However, when the Al content is less than 3.0%, sufficient oxidation resistance cannot be obtained. On the other hand, when the Al content exceeds 10.0%, workability is degraded, resulting in difficulty in production of a foil. Therefore, the Al content is set at 3.0% to 10.0%, and preferably 4.0% to 6.0%.

Cu: 0.03% to 1.0%

Figure 2:
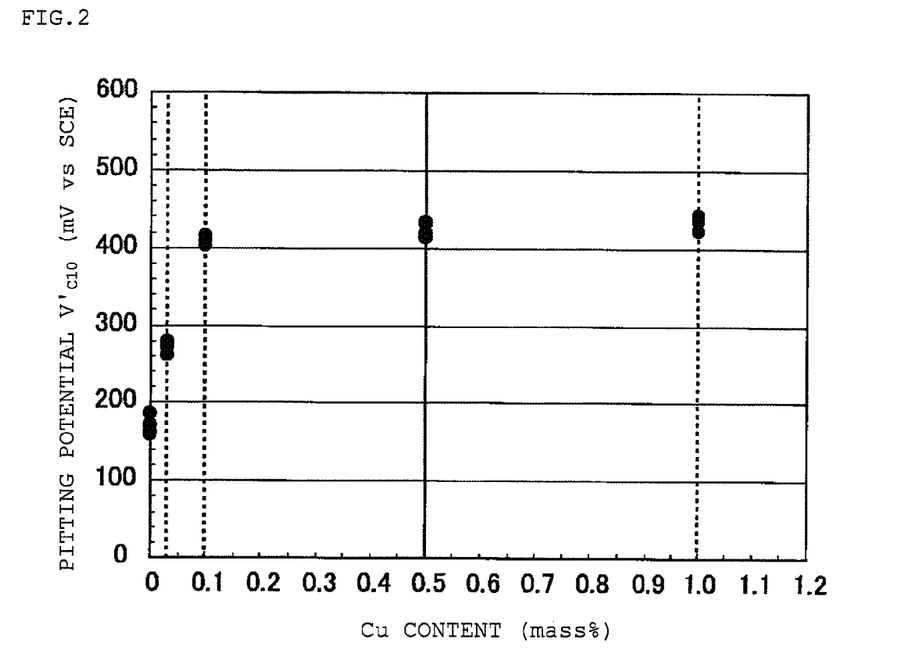
FIG. 2 is a graph showing the relationship between the Cu content and the pitting potential.

Cu is an element that is effective in improving oxidation resistance at high temperatures and improving salt corrosion resistance in an Fe—Cr—Al-based stainless steel foil with a Cr content of more than 15.0% and an Al content of 3.0% or more as that in the present invention. FIG. 2 shows the results of the pitting potential in a 3.5% by mass NaCl solution at 30° C., measured by the method described later, when the Cu content in an alloy, containing 0.006% to 0.008% of C, 0.12% to 0.15% of Si, 0.14% to 0.18% of Mn, 0.0007% to 0.0008% of S, 0.022% to 0.026% of P, 18.0% to 18.4% of Cr, 0.11% to 0.15% of Ni, 5.64% to 5.84% of Al, 0.008% to 0.011% of N, 0.003% to 0.006% of Ti, 0.003% to 0.004% of Nb, 0.003% to 0.005% of Ta, 0.032% 0.037% of Zr, 0.069% to 0.075% of La, 0.001% to 0.002% of Ce, 2.95% to 3.08% of Mo, 24 to 34 ppm of Ca, 21 to 27 ppm of Mg, and the balance being Fe and incidental impurities, was changed in the range of 0% (note that 0% means equal to or less than the detection limit, and specifically, less than 0.01%) to 1.0%. As is clear from the results, by setting the Cu content at 0.03% or more, the pitting potential serving as an index of salt corrosion resistance is improved.

However, when the Cu content exceeds 1.0%, workability is degraded, resulting in difficulty in production of a foil. Therefore, the Cu content is set at 0.03% to 1.0%. In view of salt corrosion resistance and low cost, the Cu content is preferably set at 0.1% to 0.5%.

N: 0.10% or Less

When the N content exceeds 0.10%, toughness is deteriorated, and workability is degraded, resulting in difficulty in production of a foil. Therefore, the N content is set at 0.10% or less, and preferably 0.05% or less.

Ti: 0.02% or Less

Ti is an element that is likely to be oxidized. When the content thereof exceeds 0.02%, a large amount of Ti oxides is mixed into the $Al_2O_3$ layer, resulting in a marked deterioration in brazability and a deterioration in oxidation resistance at high temperatures. Therefore, the Ti content is set at 0.02% or less, and preferably 0.01% or less. More preferably, the Ti content is decreased as much as possible.

Nb: 0.02% or Less

When the Nb content exceeds 0.02%, a non-protective oxide layer composed of $(Fe,Al)NbO_4$ is formed, resulting in a marked deterioration in oxidation resistance at high temperatures. Furthermore, since $(Fe,Al)NbO_4$ has a high thermal expansion coefficient, it accelerates distortion of the foil, which causes separation of the catalyst. Therefore, the Nb content is set at 0.02% or less, and preferably 0.01% or less. More preferably, the Nb content is decreased as much as possible.

Ta: 0.02% or Less

As is the case with Nb, when the Ta content exceeds 0.02%, a non-protective oxide layer composed of $(Fe,Al)TaO_4$ having a high thermal expansion coefficient is formed, resulting in a marked deterioration in oxidation resistance at high temperatures. The oxide layer accelerates distortion of the foil, which causes separation of the catalyst. Therefore, the Ta content is set at 0.02% or less, and preferably 0.01% or less. More preferably, the Ta content is decreased as much as possible.

Furthermore, the total content of Nb and Ta is more preferably set at 0.03% or less, and still more preferably 0.02% or less.

Zr: 0.005% to 0.20%

Zr binds to C and N in steel to improve creep characteristics. At the same time, toughness is improved and workability is improved, facilitating production of a foil. Furthermore, Zr is concentrated in $Al_2O_3$ grain boundaries in the $Al_2O_3$ layer to improve oxidation resistance at high temperatures and strength at high temperatures, in particular, distortion resistance. In order to obtain such effects, it is necessary to set the Zr content at 0.005% or more. On the other hand, when the Zr content exceeds 0.20%, Zr forms an intermetallic compound with Fe or the like, resulting in a deterioration in toughness. Therefore, the Zr content is set at 0.005% to 0.20%, and preferably 0.02% to 0.06%.

REM (Excluding Ce): 0.03% to 0.20%

The term "REM excluding Ce" refers to 14 elements with atomic numbers 57 to 71, such as La, Nd, and Sm, excluding Ce.

In general, REM excluding Ce improves adhesion of an $Al_2O_3$ layer, and has a noticeable effect in improving peeling resistance of the $Al_2O_3$ layer in an environment repeatedly subjected to oxidation. Furthermore, since REM excluding Ce increases the size of resulting $Al_2O_3$ columnar crystals, the density of oxide grain boundaries serving as diffusion paths for oxygen is decreased, resulting in improvement in oxidation resistance at high temperatures and strength at high temperatures, in particular, distortion resistance. In order to obtain such effects, it is necessary to set the content of REM excluding Ce at 0.03% or more. On the other hand, when the content of REM excluding Ce exceeds 0.20%, toughness is deteriorated, and workability is degraded, resulting in difficulty in production of a foil. Therefore, the content of REM excluding Ce is set at 0.03% to 0.20%, and preferably 0.05% to 0.10%.

Furthermore, when REM excluding Ce is added, for the purpose of cost reduction, a metal (mischmetal) in which the REM is not separated or refined may be used. However, in the case where the mischmetal contains Ce, for the reason described below, it is required to add the mischmetal with the limit that the Ce content does not exceed 0.02%. When it is difficult to reduce the amount of Ce, a metal which has been subjected to separation and refinement is added alone. In such a case, it is preferable to use La which is relatively inexpensive and easily available among REMs.

Ce: 0.02% or Less

When the Ce content exceeds 0.02%, CeO-type oxides are formed at the interface between the $Al_2O_3$ layer and the surface of base steel, which markedly decreases strength at high temperatures, in particular, distortion resistance, resulting in defects in geometry. Therefore, the Ce content is set at 0.02% or less. Preferably, the Ce content is reduced as much as possible.

At Least One of Mo and W: 2.0% to 6.0% in Total

Mo and W increase rupture stress at high temperatures to prolong the life of catalyst carriers. Furthermore, these elements also stabilize an $Al_2O_3$ layer to improve salt corrosion resistance. In an alloy having a Cr content of more than 15.0% and less than 25.0%, such as that of embodiments of the present invention, in order to obtain such effects, it is necessary to set the content of at least one of Mo and W at 2.0% or more in total. On the other hand, when the content of at least one of Mo and W exceeds 6.0% in total, workability is degraded, resulting in difficulty in production of a foil. Therefore, the content of at least one of Mo and W is set at 2.0% to 6.0% in total, preferably 3.0% to 5.5%, and more preferably 4.5% to 5.5%.

The balance other than the compositional elements described above is composed of Fe and incidental impurities. However, for the reasons described below, the steel foil may contain, separately or together, at least one of 0.01% to 0.20% of Hf, 10 to 300 ppm of Ca, 15 to 300 ppm of Mg, and 3 to 100 ppm of B.

At Least One of Hf: 0.01% to 0.20%, Ca: 10 to 300 ppm, Mg: 15 to 300 ppm, and B: 3 to 100 ppm Since Hf improves adhesion between an $Al_2O_3$ layer and a substrate and suppresses a decrease in the amount of solid solution Al, an effect of improving oxidation resistance at high temperatures is obtained. In order to obtain such an effect, the Hf content is preferably set at 0.01% or more. On the other hand, when the Hf content exceeds 0.20%, Hf in the form of $HfO_2$ mixes into the $Al_2O_3$ layer and serves as a diffusion path for oxygen, and hastens a decrease in the amount of solid solution Al by oxidation. Furthermore, Hf forms an intermetallic compound with Fe, resulting in a deterioration in toughness. Therefore, the Hf content is preferably set at 0.01% to 0.20%, and more preferably 0.02% to 0.10%.

Furthermore, as is the case with Hf, Ca and Mg have a function of improving adhesion of an $Al_2O_3$ layer. In order to obtain such an effect, it is preferable to set the Ca content at 10 ppm or more and the Mg content at 15 ppm or more. On the other hand, when the Ca content or the Mg content exceeds 300 ppm, toughness is deteriorated, and oxidation resistance at high temperatures is also deteriorated. Therefore, preferably, the Ca content is set at 10 to 300 ppm, and the Mg content is set at 15 to 300 ppm. More preferably, each of the Ca content and the Mg content is set at 20 to 100 ppm.

Furthermore, B has an effect of inhibiting precipitation of grain boundary precipitates and improving durability of carriers at high temperatures. Such an effect becomes noticeable when the B content is 3 ppm or more. On the other hand, when the B content exceeds 100 ppm, toughness of a hot-rolled steel sheet is degraded. Therefore, the B content is preferably set at 3 to 100 ppm, and more preferably 10 to 50 ppm.

When a stainless steel foil of the present invention having the composition described above is used in a catalyst carrier for an exhaust gas purifying device, a smaller foil thickness is more advantageous in order to decrease the exhaust back pressure. However, as described in the beginning, catalyst carriers for exhaust gas purifying devices have become to be used in a harsher environment than before and there is a possibility of occurrence of fractures and the like. Therefore, preferably, the foil thickness is set at 20 to 100 μm. When the stainless steel foil is used in a catalyst carrier for an exhaust gas purifying device, in the case where vibration resistance and durability are particularly required, the foil thickness is more preferably set at about 50 to 100 μm. In the case where a high cell density and a low back pressure are particularly required, the foil thickness is more preferably set at about 20 to 50 μm.

A stainless steel foil according to the present invention can be produced, for example, by the production method described below.

First, steel having the composition described above is refined with a steel converter, an electric furnace, or the like and subjected to secondary refining by VOD (vacuum oxygen decarburization) or AOD (argon oxygen decarburization). Then, the refined steel is formed into a steel slab by ingot making-blooming or continuous casting, and the steel slab is heated to 1,050° C. to 1,250° C. and then subjected to hot rolling to produce a hot-rolled steel sheet. Next, scales on the surface of the hot-rolled steel sheet are removed by pickling, shotblasting, grinding, or the like, and annealing and cold rolling are repeated several times. Thereby, a stainless steel foil with a predetermined thickness, for example, 20 to 100 μm, is produced.

Examples

Steels having the compositions shown in Table 1-1 to Table 1-4 which had been made by vacuum melting were heated to 1,200° C. and then subjected to hot rolling in the temperature range of 900° C. to 1,200° C. to obtain hot-rolled steel sheets having a thickness of 4 mm. Next, the resulting hot-rolled steel sheets were annealed in air at 1,000° C. and subjected t pickling, followed by cold rolling to obtain cold-rolled steel sheets with a thickness of 1.0 mm. In this stage, in the steel No. 17 of Table 1 having a Cr content of 39.8%, which exceeded the preferred range of the present invention, fractures occurred during hot rolling, and it was not possible to form a hot-rolled steel sheet. The cold-rolled steel sheets excluding the steel No. 17 were annealed in air at 950° C. to 1,050° C.×1 minute and then subjected to pickling. Cold rolling with a cluster mill and annealing were repeated several times to obtain foils with a width of 100 mm and a foil thickness of 40 μm.

Regarding the cold-rolled steel sheets and the foils thus obtained, strength at high temperatures (rupture stress and distortion resistance), oxidation resistance at high temperatures, and salt corrosion resistance were evaluated by the methods described below.

Figure 3:
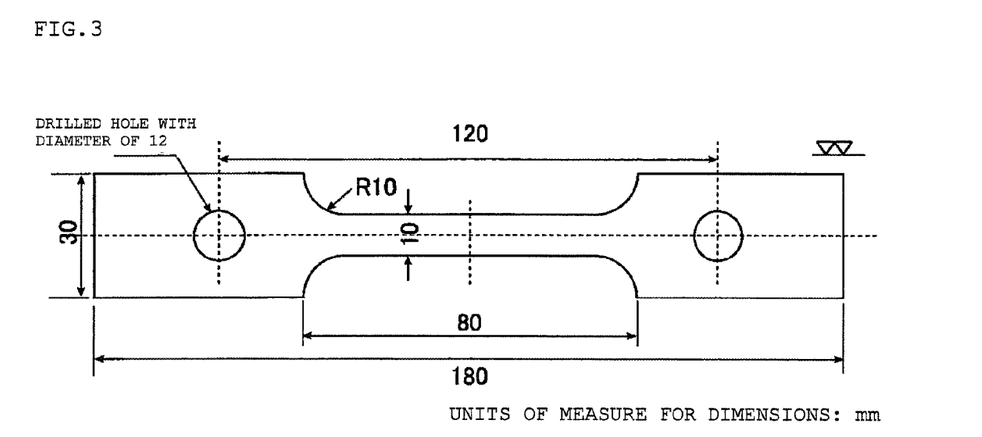
FIG. 3 is a view showing the shape of a specimen used in the high-temperature tensile test in Examples.

Rupture stress: First, the cold-rolled steel sheet with a thickness of 1 mm was subjected to a heat treatment at 1,200° C.×30 minutes, in a vacuum of $4 \times 10^{-5}$ Torr ($5.3 \times 10^{-3}$ Pa) or less, simulating a heat treatment when contact points between a corrugated foil (foil which has been subjected to corrugation) and a flat foil were subjected to diffusion bonding or bonding by brazing. Next, a specimen shown in FIG. 3 was cut out from the heat-treated, cold-rolled steel sheet, and by carrying out a high-temperature tensile test at 900° C., the rupture stress was measured. In this case, the cross head speed was set at 0.2 mm/min initially and at 5 mm/min after the proof stress was exceeded. The measurement results of the rupture stress were evaluated by the following criteria: xC: less than 40 MPa, ⊙B: 40 MPa or more and less than 60 MPa, and ⊙A: 60 MPa or more. When evaluated to be ⊙B or ⊙A, the specimen was considered to be satisfying the purpose of the present invention.

Distortion resistance: First, the foil with a foil thickness of 40 μm was subjected to a heat treatment at 1,200° C.×30 minutes, corresponding to a heat treatment during diffusion bonding or bonding by brazing, in a vacuum of $4 \times 10^{-5}$ Torr ($5.3 \times 10^{-3}$ Pa) or less. Next, a specimen of 100 mm in width×50 mm in length was cut out from the heat-treated foil, and rolled, in the length direction, into a cylinder with a diameter of 5 mm, and the edges thereof were fastened by spot welding. Three such specimens were prepared for each foil. The specimens were heated at 1,150° C.×400 hours in an air atmosphere furnace, and an average dimensional distortion (the ratio of the increased length of the cylinder after heating to the length of the cylinder before heating) of the three specimens was measured. The measurement results of the average dimensional distortion were evaluated by the following criteria: xC: more than 5%, ○B: more than 3% and 5% or less, and ⊙A: 3% or less. When evaluated to be ○B or ⊙A, the foil was considered to be satisfying the purpose of the present invention.

Oxidation resistance at high temperatures: First, the foil with a foil thickness of 40 μm was subjected to a heat treatment at 1,200° C.×30 minutes, corresponding to a heat treatment during diffusion bonding or bonding by brazing, in a vacuum of $4\times10^{-5}$ Torr ($5.3\times10^{-3}$ Pa) or less. Next, three specimens of 20 mm in width×30 mm in length were cut out from the heat-treated foil, and heated at 1,150° C.×400 hours in an air atmosphere furnace. An average mass gain due to oxidation (the amount obtained by dividing the change in weight before and after heating with the initial surface area) of the three specimens was measured. In this case, scales separated from the specimen after heating were collected and added to the amount of increase due to oxidation. The measurement results of the average mass gain due to oxidation were evaluated by the following criteria: xC: more than 15 $g/m^2$, ○B: more than 10 $g/m^2$ and 15 $g/m^2$ or less, and ⊙A: 10 $g/m^2$ or less. When evaluated to be ○B or ⊙A, the foil was considered to be satisfying the purpose of the present invention.

Salt corrosion resistance: First, a 20 mm square specimen was cut out from the cold-rolled steel sheet with a thickness of 1 mm, and the specimen was sealed with a resin excluding an area of 11×11 mm on the surface. Then, a passivation treatment was performed by immersing the specimen in nitric acid with a concentration of 10% by mass. Furthermore, an area of 10×10 mm on the surface was polished. Next, on the basis of JIS G0577 "Method of pitting potential measurement for stainless steels", the specimen was immersed in a 3.5% by mass NaCl solution at 30° C. and left to stand for 10 minutes. Then, potential scanning was started, and the pitting potential was measured. The measurement results of the pitting potential were evaluated by the following criteria: xC: less than 200 (mV vs SCE), ○B: 200 (mV vs SCE) or more and less than 400 (mV vs SCE), and ⊙A: 400 (mV vs SCE) or more. When evaluated to be ○B or ⊙A, the specimen was considered to be satisfying the purpose of the present invention.

The results are shown in Table 2. As is obvious from the table, the steel Nos. 1 to 12 and 18 to 24, which are examples of the present invention, have high strength at high temperatures (rupture stress and distortion resistance), excellent oxidation resistance at high temperatures, and excellent salt corrosion resistance. In contrast, the steel Nos. 13 to 16, which are comparative examples, are poor in terms of at least one property of strength at high temperatures, oxidation resistance at high temperatures, and salt corrosion resistance. The supposed reasons for the steels being poor in terms of the individual properties are shown below. Note that in the steel No. 17, since the Cr content far exceeded the preferred range of the present invention, hot brittleness occurred, and it was not possible to perform hot rolling.

[Steel No. 13] Since the Cu content is below the preferred range of the present invention, the pitting potential is poor.

[Steel No. 14] Since the Mo content is below the preferred range of the present invention, strength at high temperatures is poor.

[Steel No. 15] Since the La content is below the preferred range of the present invention and the Ce content exceeds the preferred range of the present invention, oxidation resistance is poor, and abnormal oxidation occurs, resulting in a change of form. Since the Ce exceeds the preferred range of the present invention, distortion resistance is poor.

[Steel No. 16] Since the Al content is below the preferred range of the present invention, oxidation resistance is poor, and abnormal oxidation occurs, resulting in a change of form.

REFERENCE SIGNS LIST 1 flat foil
2 corrugated foil
3 external cylinder
4 metal honeycomb

TABLE 1-1

| Steel No. | Composition (mass %) | | | | | | | | | | | | | | Remarks |
|---|---|---|---|---|---|---|---|---|---|---|---|---|---|---|---|
| | C | Si | Mn | P | S | Cr | Ni | Cu | Al | N | Ti | Nb | Ta | Zr | |
| 1 | 0.012 | 0.11 | 0.20 | 0.024 | 0.0011 | 20.9 | 0.10 | 0.04 | 5.52 | 0.008 | 0.003 | 0.002 | 0.003 | 0.044 | Invention example |
| 2 | 0.008 | 0.14 | 0.18 | 0.025 | 0.0009 | 20.4 | 0.15 | 0.06 | 5.65 | 0.012 | 0.005 | 0.003 | 0.005 | 0.036 | Invention example |
| 3 | 0.007 | 0.14 | 0.16 | 0.023 | 0.0007 | 24.5 | 0.12 | 0.04 | 6.05 | 0.009 | 0.004 | 0.002 | 0.005 | 0.033 | Invention example |
| 4 | 0.007 | 0.15 | 0.14 | 0.025 | 0.0010 | 21.1 | 0.11 | 0.06 | 5.85 | 0.013 | 0.005 | 0.002 | 0.001 | 0.036 | Invention example |
| 5 | 0.007 | 0.15 | 0.14 | 0.023 | 0.0009 | 24.4 | 0.11 | 0.09 | 5.68 | 0.008 | 0.004 | 0.002 | 0.003 | 0.042 | Invention example |
| 6 | 0.008 | 0.16 | 0.19 | 0.024 | 0.0009 | 16.5 | 0.15 | 0.05 | 4.89 | 0.019 | 0.006 | 0.003 | 0.003 | 0.046 | Invention example |
| 7 | 0.006 | 0.09 | 0.13 | 0.026 | 0.0011 | 24.1 | 0.13 | 0.04 | 5.98 | 0.007 | 0.006 | 0.004 | 0.003 | 0.032 | Invention example |
| 8 | 0.003 | 0.11 | 0.17 | 0.023 | 0.0008 | 21.5 | 0.11 | 0.03 | 5.56 | 0.009 | 0.005 | 0.002 | 0.002 | 0.036 | Invention example |
| 9 | 0.006 | 0.12 | 0.14 | 0.024 | 0.0008 | 18.4 | 0.15 | 0.03 | 5.84 | 0.009 | 0.004 | 0.004 | 0.004 | 0.035 | Invention example |
| 10 | 0.008 | 0.14 | 0.18 | 0.022 | 0.0008 | 18.3 | 0.14 | 0.10 | 5.67 | 0.008 | 0.005 | 0.003 | 0.005 | 0.032 | Invention example |
| 11 | 0.007 | 0.15 | 0.15 | 0.026 | 0.0007 | 18.1 | 0.11 | 0.52 | 5.64 | 0.011 | 0.003 | 0.003 | 0.004 | 0.037 | Invention example |
| 12 | 0.008 | 0.14 | 0.14 | 0.025 | 0.0007 | 18.0 | 0.11 | 0.98 | 5.74 | 0.010 | 0.005 | 0.004 | 0.003 | 0.035 | Invention example |

TABLE 1-2

| | Composition (mass %) | | | | | | | | | | |
|---|---|---|---|---|---|---|---|---|---|---|---|
| Steel No. | REM excluding Ce | | | | W | Mo | Hf | Ca (ppm) | Mg (ppm) | B (ppm) | Remarks |
| | La | Nd | Sm | Ce | | | | | | | |
| 1 | 0.074 | — | — | 0.002 | — | 4.83 | — | 25 | 15 | — | Invention example |
| 2 | 0.069 | — | — | 0.001 | — | 2.08 | — | 30 | 22 | — | Invention example |
| 3 | 0.089 | — | — | 0.001 | — | 4.85 | — | 22 | 23 | — | Invention example |
| 4 | 0.063 | — | — | 0.002 | 1.95 | 2.95 | — | 28 | 19 | — | Invention example |
| 5 | 0.067 | — | — | 0.001 | 2.05 | 2.85 | — | 18 | 20 | — | Invention example |
| 6 | 0.088 | — | — | 0.003 | — | 5.12 | 0.032 | 19 | 25 | — | Invention example |
| 7 | 0.049 | — | — | 0.002 | — | 3.56 | — | 23 | 18 | — | Invention example |
| 8 | 0.059 | — | — | 0.001 | — | 2.98 | 0.036 | 26 | 36 | — | Invention example |
| 9 | 0.071 | — | — | 0.001 | — | 2.95 | — | 32 | 27 | — | Invention example |
| 10 | 0.074 | — | — | 0.002 | — | 3.01 | — | 34 | 24 | — | Invention example |
| 11 | 0.069 | — | — | 0.001 | — | 3.00 | — | 24 | 21 | — | Invention example |
| 12 | 0.075 | — | — | 0.001 | — | 3.08 | — | 26 | 24 | — | Invention example |

TABLE 1-3

| Steel No. | Composition (mass %) | | | | | | | | | | | | | | Remarks |
|---|---|---|---|---|---|---|---|---|---|---|---|---|---|---|---|
| | C | Si | Mn | P | S | Cr | Ni | Cu | Al | N | Ti | Nb | Ta | Zr | |
| 13 | 0.008 | 0.14 | 0.15 | 0.025 | 0.0008 | 18.4 | 0.15 | — | 5.68 | 0.008 | 0.006 | 0.004 | 0.004 | 0.034 | Comparative example |
| 14 | 0.008 | 0.15 | 0.22 | 0.023 | 0.0008 | 20.8 | 0.15 | 0.07 | 5.76 | 0.007 | 0.003 | 0.003 | 0.005 | 0.040 | Comparative example |
| 15 | 0.007 | 0.12 | 0.16 | 0.026 | 0.0009 | 25.0 | 0.11 | 0.04 | 5.85 | 0.008 | 0.005 | 0.003 | 0.003 | 0.050 | Comparative example |
| 16 | 0.006 | 0.13 | 0.18 | 0.025 | 0.0007 | 20.7 | 0.13 | 0.08 | 1.98 | 0.009 | 0.006 | 0.004 | 0.003 | 0.036 | Comparative example |
| 17 | 0.007 | 0.16 | 0.19 | 0.024 | 0.0006 | 39.8 | 0.12 | 0.09 | 3.58 | 0.009 | 0.004 | 0.002 | 0.004 | 0.035 | Comparative example |
| 18 | 0.009 | 0.15 | 0.19 | 0.025 | 0.0009 | 20.2 | 0.12 | 0.05 | 5.67 | 0.009 | 0.004 | 0.002 | 0.003 | 0.034 | Invention example |
| 19 | 0.009 | 0.11 | 0.19 | 0.026 | 0.0007 | 20.1 | 0.10 | 0.05 | 5.78 | 0.008 | 0.003 | 0.003 | 0.005 | 0.035 | Invention example |
| 20 | 0.007 | 0.14 | 0.18 | 0.025 | 0.0009 | 20.4 | 0.15 | 0.06 | 3.07 | 0.012 | 0.005 | 0.004 | 0.005 | 0.036 | Invention example |
| 21 | 0.008 | 0.15 | 0.17 | 0.023 | 0.0007 | 17.2 | 0.12 | 0.07 | 3.11 | 0.009 | 0.004 | 0.002 | 0.005 | 0.033 | Invention example |
| 22 | 0.006 | 0.13 | 0.18 | 0.029 | 0.0006 | 20.9 | 0.13 | 0.06 | 5.81 | 0.011 | 0.004 | 0.003 | 0.003 | 0.038 | Invention example |
| 23 | 0.006 | 0.13 | 0.18 | 0.025 | 0.0007 | 20.4 | 0.15 | 0.12 | 5.81 | 0.009 | 0.006 | 0.004 | 0.003 | 0.036 | Invention example |
| 24 | 0.007 | 0.16 | 0.19 | 0.024 | 0.0006 | 20.6 | 0.14 | 0.09 | 5.84 | 0.009 | 0.004 | 0.002 | 0.004 | 0.035 | Invention example |

TABLE 1-4

| | Composition (mass %) | | | | | | | | | | |
|---|---|---|---|---|---|---|---|---|---|---|---|
| Steel No. | REM excluding Ce | | | | W | Mo | Hf | Ca (ppm) | Mg (ppm) | B (ppm) | Remarks |
| | La | Nd | Sm | Ce | | | | | | | |
| 13 | 0.071 | — | — | 0.001 | — | 3.04 | — | 24 | 23 | — | Comparative example |
| 14 | 0.088 | — | — | 0.003 | — | 1.06 | — | 30 | 18 | — | Comparative example |
| 15 | 0.021 | — | — | 0.035 | — | 2.55 | 0.030 | 32 | 16 | — | Comparative example |
| 16 | 0.083 | — | — | 0.002 | — | 2.15 | — | 25 | 23 | — | Comparative example |
| 17 | 0.053 | — | — | 0.001 | — | 3.21 | — | 18 | 19 | — | Comparative example |
| 18 | 0.075 | — | — | 0.002 | — | 5.45 | — | 32 | 24 | 10 | Invention example |
| 19 | 0.069 | — | — | 0.002 | — | 3.11 | — | 27 | 18 | 12 | Invention example |
| 20 | 0.068 | — | — | 0.001 | — | 3.09 | — | 30 | 22 | 19 | Invention example |
| 21 | 0.079 | — | — | 0.002 | — | 2.09 | — | 31 | 23 | 29 | Invention example |
| 22 | 0.075 | — | — | 0.001 | — | 5.12 | — | 30 | 31 | 42 | Invention example |
| 23 | — | 0.065 | — | 0.002 | — | 5.05 | — | 26 | 35 | 31 | Invention example |
| 24 | — | — | 0.071 | 0.001 | — | 5.06 | — | 24 | 24 | 24 | Invention example |

TABLE 2

| Steel No. | Strength at high temperatures | | Distortion resistance | | oxidation resistance at high temperatures | | Salt corrosion resistance | | Others | Remarks |
|---|---|---|---|---|---|---|---|---|---|---|
| | Rupture stress MPa | Evaluation | Distortion (%) | Evaluation | Mass gain due to oxidation (g/m2) | Evaluation | Pitting potential (mV vs SCE) | Evaluation | | |
| 1 | 78 | ⊚A | 0.8 | ⊚A | 5.4 | ⊚A | 412 | ⊚A | — | Invention example |
| 2 | 61 | ⊚A | 1.2 | ⊚A | 11 | ○B | 347 | ○B | — | Invention example |
| 3 | 91 | ⊚A | 0.7 | ⊚A | 6.4 | ⊚A | 512 | ⊚A | — | Invention example |
| 4 | 84 | ⊚A | 1.3 | ⊚A | 5.7 | ⊚A | 435 | ⊚A | — | Invention example |
| 5 | 95 | ⊚A | 0.8 | ⊚A | 5.9 | ⊚A | 565 | ⊚A | — | Invention example |
| 6 | 84 | ⊚A | 3.2 | ○B | 13 | ○B | 376 | ○B | — | Invention example |
| 7 | 78 | ⊚A | 1.3 | ⊚A | 6.8 | ⊚A | 534 | ⊚A | — | Invention example |
| 8 | 62 | ⊚A | 0.9 | ⊚A | 4.9 | ⊚A | 385 | ○B | — | Invention example |
| 9 | 58 | ○B | 0.9 | ⊚A | 6.7 | ⊚A | 273 | ○B | — | Invention example |
| 10 | 62 | ⊚A | 0.7 | ⊚A | 5.9 | ⊚A | 409 | ⊚A | — | Invention example |
| 11 | 61 | ⊚A | 1.1 | ⊚A | 6.3 | ⊚A | 423 | ⊚A | — | Invention example |
| 12 | 67 | ⊚A | 0.7 | ⊚A | 6.4 | ⊚A | 435 | ⊚A | — | Invention example |
| 13 | 57 | ○B | 3.9 | ○B | 12 | ○B | 171 | XC | — | Comparative example |
| 14 | 34 | XC | 4.1 | ○B | 5.9 | ⊚A | 327 | ○B | — | Comparative example |
| 15 | 84 | ⊚A | 6.1 | XC | 54 | XC | 507 | ⊚A | — | Comparative example |
| 16 | 31 | XC | 7.2 | XC | 67 | XC | 367 | ○B | — | Comparative example |
| 17 | — | — | — | — | — | — | — | — | Unable to be rolled | Comparative example |
| 18 | 82 | ⊚A | 0.9 | ⊚A | 4.8 | ⊚A | 453 | ⊚A | — | Invention example |
| 19 | 72 | ⊚A | 1.1 | ⊚A | 6.8 | ⊚A | 412 | ⊚A | — | Invention example |
| 20 | 54 | ○B | 2.1 | ⊚A | 7.8 | ⊚A | 351 | ○B | — | Invention example |
| 21 | 46 | ○B | 1.9 | ⊚A | 11.1 | ○B | 227 | ○B | — | Invention example |
| 22 | 88 | ⊚A | 0.7 | ⊚A | 4.5 | ⊚A | 443 | ⊚A | — | Invention example |
| 23 | 81 | ⊚A | 0.5 | ⊚A | 5.9 | ⊚A | 456 | ⊚A | — | Invention example |
| 24 | 82 | ⊚A | 0.6 | ⊚A | 6.1 | ⊚A | 461 | ⊚A | — | Invention example |

The invention claimed is:

1. A stainless steel foil comprising, in percent by mass, 0.05% or less of C, 2.0% or less of Si, 1.0% or less of Mn, 0.003% or less of S, 0.05% or less of P, more than 15.0% and less than 25.0% of Cr, 0.05% or more and 0.30% or less of Ni, 3.0% to 10.0% of Al, 0.03% to 1.0% of Cu, 0.10% or less of N, 0.02% or less of Ti, 0.02% or less of Nb, 0.02% or less of Ta, 0.005% to 0.20% of Zr, 0.03% to 0.20% of REM excluding Ce, 0.02% or less of Ce, 4.5% to 6.0% of at least one of Mo and W, and the balance being Fe and incidental impurities.

2. The stainless steel foil according to claim 1, wherein the REM excluding Ce is La.

3. The stainless steel foil according to claim 1, wherein the stainless steel foil comprises, in percent by mass, 3.0% to 5.5% of Mo.

4. The stainless steel foil according to claim 1, further comprising at least one of 0.01% to 0.20% of Hf (in percent by mass), 10 to 300 ppm of Ca, 15 to 300 ppm of Mg, and 3 to 100 ppm of B (in ppm by mass).

5. The stainless steel foil according to claim 1, wherein the foil thickness is 20 to 100 μm.

6. A catalyst carrier for an exhaust gas purifying device using the stainless steel foil according to claim 1.

7. The stainless steel foil according to claim 2, wherein the stainless steel foil comprises, in percent by mass, 3.0% to 5.5% of Mo.

8. The stainless steel foil according to claim 2, further comprising at least one of 0.01% to 0.20% of Hf (in percent by mass), 10 to 300 ppm of Ca, 15 to 300 ppm of Mg, and 3 to 100 ppm of B (in ppm by mass).

9. The stainless steel foil according to claim 3, further comprising at least one of 0.01% to 0.20% of Hf (in percent by mass), 10 to 300 ppm of Ca, 15 to 300 ppm of Mg, and 3 to 100 ppm of B (in ppm by mass).

10. The stainless steel foil according to claim 7, further comprising at least one of 0.01% to 0.20% of Hf (in percent by mass), 10 to 300 ppm of Ca, 15 to 300 ppm of Mg, and 3 to 100 ppm of B (in ppm by mass).

11. The stainless steel foil according to claim 2, wherein the foil thickness is 20 to 100 μm.

12. The stainless steel foil according to claim 3, wherein the foil thickness is 20 to 100 μm.

13. The stainless steel foil according to claim 7, wherein the foil thickness is 20 to 100 μm.

14. The stainless steel foil according to claim 4, wherein the foil thickness is 20 to 100 μm.

15. The stainless steel foil according to claim 8, wherein the foil thickness is 20 to 100 μm.

16. The stainless steel foil according to claim 9, wherein the foil thickness is 20 to 100 μm.

17. The stainless steel foil according to claim 10, wherein the foil thickness is 20 to 100 μm.

\* \* \* \* \*